United States Patent
Zhou et al.

(10) Patent No.: US 7,660,761 B2
(45) Date of Patent: Feb. 9, 2010

(54) SYSTEM AND METHOD FOR AUTOMATED TRADING

(75) Inventors: Yuli Zhou, Darien, CT (US); Nickolai Ogurtsov, Stamford, CT (US)

(73) Assignee: UBS AG, Zurich (CH)

( * ) Notice: Subject to any disclaimer, the term of this patent is extended or adjusted under 35 U.S.C. 154(b) by 889 days.

(21) Appl. No.: 10/623,434

(22) Filed: Jul. 17, 2003

(65) Prior Publication Data
US 2004/0024689 A1 Feb. 5, 2004

Related U.S. Application Data

(60) Provisional application No. 60/396,682, filed on Jul. 17, 2002.

(51) Int. Cl.
*G06Q 40/00* (2006.01)
(52) U.S. Cl. .................. 705/37; 705/35; 705/36 R
(58) Field of Classification Search .............. 705/35, 705/37, 36 R
See application file for complete search history.

(56) References Cited

U.S. PATENT DOCUMENTS

| | | | |
|---|---|---|---|
| 4,980,826 A | 12/1990 | Wagner | |
| 5,297,032 A | 3/1994 | Trojan et al. | |
| 6,029,195 A | 2/2000 | Herz | |
| 6,112,189 A | 8/2000 | Rickard et al. | |
| 7,356,498 B2 * | 4/2008 | Kaminsky et al. | 705/37 |
| 2004/0143542 A1 * | 7/2004 | Magill et al. | 705/37 |

OTHER PUBLICATIONS

U.S. Appl. No. 60/141,859.*
U.S. Appl. No. 60/155,489.*
NASDAQ: Nasdaq Europe and the Berlin Stock Exchange announce partnership; Both markets to take a significant minority stake in each other's shares; Two step process to create a common trading platform M2 Presswire. Coventry: Nov. 15, 2001. p. 1.*
NASD Disciplines Firms and Individuals By Pamela Sebastian Ridge. Wall Street Journal. (Eastern edition). New York, N.Y.: Jul. 30, 2001. p. B.9.A.*
Nasdaq Amends New Trading System—Exchange Addresses Opponents' Concerns in Hopes of Pleasing Regulators—'This Change Emphasizes Choice' By Greg Ip. Wall Street Journal. (Europe). Brussels: Sep. 29, 2000. p. 24.*

* cited by examiner

*Primary Examiner*—Lalita M Hamilton
(74) *Attorney, Agent, or Firm*—Proskauer Rose LLP

(57) ABSTRACT

The present invention relates to systems and methods for automated trading. More particularly, the present invention relates to a system and method for processing trade orders essentially instantaneously and filling trade orders with improvement over the National Best Bid and Offer (NBBO) by internalizing certain customer trade orders.

29 Claims, 1 Drawing Sheet

SYSTEM AND METHOD FOR AUTOMATED TRADING

RELATED APPLICATION

This application is based upon and claims the benefit of U.S. provisional application Ser. No. 60/396,682, filed on Jul. 17, 2002, for Yuli Zhou and Nickolai Ogurtsov, entitled "SYSTEM AND METHOD FOR AUTOMATED TRADING." The contents of this provisional application are fully incorporated herein by reference.

FIELD OF THE INVENTION

The present invention relates to systems and methods for automated trading. More particularly, the present invention relates to a system and method for processing trade orders essentially instantaneously and filling trade orders with improvement over the National Best Bid and Offer (NBBO) by internalizing certain customer trade orders.

BACKGROUND OF THE INVENTION

There are different types of marketplaces for executing securities transactions. Marketplaces include conventional stock exchanges, electronic exchanges, alternative trading systems, and reporting facilities. The marketplaces have different characteristics.

One type of marketplace is a conventional stock exchange that uses specialists to fill trade orders. The New York Stock Exchange (NYSE) is an example of a conventional stock exchange system that uses specialists. Specialists are members (of the exchange) who maintain an inventory of the securities for which they are designated specialists and stand ready to buy and sell shares of those securities as principals for their own accounts as necessary to satisfy their responsibility for maintaining orderly markets in those securities. Only one specialist can be designated for a given security, but members can be specialists for more than one security.

In the conventional stock exchange, trade orders are communicated to specialists face-to-face, by telephone, and by computer. Conventional stock exchanges are auction markets that have a physical exchange floor where buy and sell orders actually "meet" and orders are matched under the supervision of the specialist.

Another type of marketplace is an Over-the-Counter (OTC) electronic exchange that provides electronic access to posted market prices and does not use specialists or a floor-based exchange. The National Association of Securities Dealers Automated Quotation System (NASDAQ) is an example of this type of marketplace. Electronic exchange marketplaces like NASDAQ exist electronically, in the form of a communications system that constantly receives and reports prices at which geographically dispersed market makers are willing to buy and sell different financial instruments.

Market makers are similar to specialists and maintain firm bid and ask prices for securities in which they are making a market by standing ready, willing, and able to buy or sell those securities at publicly quoted prices. Market makers maintain continuous two-sided quotes (bid and ask). Market makers ensure that there is a buyer for a sell order and seller for a buy order. NASDAQ market makers place and match trade orders. Non-members of NASDAQ must place their orders and their customers' orders with a market maker who is a member of NASDAQ.

Once a market maker has entered a price, the market maker is obligated to either buy or sell at least a certain amount of securities at that price. After the market maker has either bought or sold those securities, it may then "leave the market" and enter a new bid or ask price.

In contrast to marketplaces that use specialists (e.g., the NYSE), there are usually multiple market makers in the NASDAQ market for a particular company's securities. Market makers create liquidity in the securities for which they are acting as market makers. To account for the effort and risk required to maintain liquidity, market makers are allowed to set the prices at which they are prepared to buy and sell a particular security and profit from the spread (i.e., the difference between the price which they purchased the financial instruments and the price for which they sell them).

For example, suppose a market maker has entered a sell order for a security and the bid/ask is $10.25/$10.30 per share. The market maker can try to sell the security at $10.30 per share. If it does, it can then enter a bid order to buy shares in the security and bid higher or lower than its previous bid of $10.25. If the market maker bids $10.26 and attracts a seller at the new price, it has successfully "made the spread." If the market maker sold 1000 shares at $10.30 and bought 1000 shares back at $10.26, it made $40 (1000 shares×4 cents) on the difference between the two transactions. Making the spread repeatedly with large orders can result in lucrative profits. Because bid/ask prices can change rapidly, the time elapsed between transactions is often an important factor in determining whether a market maker can successfully make the spread.

NASDAQ makes real time market data available via a computer network at three different service levels, known as Level I, Level II, and Level III. Level I, for example, provides, among other things, real time access to market data that includes the highest bid and lowest offer for a security (i.e., inside market quotes), individual market maker quotations, and trade and price volume.

Another type of marketplace is an alternative trading system (ATS), which provides ATS members and electronic exchange users, such as NASDAQ users, access to an electronic network where they can display and fill their trade orders independent of a market maker or specialist. Electronic communication networks (ECNs), such as Instinet, Strike, and Island, are examples of ATSs. ECNs also make real time market data available.

In a conventional stock exchange or an electronic exchange, buyers and sellers make their trade orders through intermediaries, i.e., the specialist or the market maker dealing in the particular financial instrument. But with an ECN, there are no intermediaries, and each bid and offer is a discrete and anonymous order that all ECN members can access and view.

Marketplaces can also be described as primary marketplaces as distinguished from marketplaces that are reporting facilities. When a trade order is transmitted to a primary marketplace, an attempt is made to match the trade order with another trade order seeking the other side of the trade. Once trade orders are matched and the trade is executed, it must be then be reported in order to comply with certain regulatory requirements. Primary marketplaces may be any marketplace, such as the NYSE, the American Stock Exchange, NASDAQ, and ECNs, such as Instinet or Island.

With reporting facilities, there is no matching of a trade order with an order seeking the other side of the trade. When reporting facilities are used, the broker-dealer or dealer already has parties for both sides of a trade and needs only to document and report the clearing of the trade in order to comply with certain regulatory requirements. The NASDAQ Automated Confirmation Transaction (ACT) is an example of a reporting facility. The Cincinnati Stock Exchange is an example of a marketplace that can be used as a reporting facility. Reporting facilities, such as NASDAQ ACT, and marketplaces that can be used as reporting facilities, such as the Cincinnati Stock Exchange, provide faster access to market data than and increased trading efficiency over primary marketplaces.

Broker-dealers are individuals or firms that buy financial instruments for themselves and for others. When acting as a broker, a broker-dealer acts as an agent and facilitates filling orders on behalf of its customer. This is also referred to as an agency execution. The broker-dealer communicates directly with the various marketplaces where the trade orders are filled.

When acting as a dealer, the broker-dealer acts as a principal and trades for its own account. This is also known as proprietary trading or principal execution. When broker-dealers act as principals, they also communicate directly with marketplaces where trade orders are filled.

When acting as an agent for a customer, broker-dealers have a best execution obligation to seek to obtain the best available price for the customer's trade order. The National Best Bid and Offer (NBBO) is the best (the highest) bid price and best (the lowest) ask price currently available for a particular security at a particular time. The NBBO is obtained from real time market data available from different marketplaces registered to trade in a particular security, including electronic exchanges, such as NASDAQ, and ECNs, such as Instinet. The NBBO is continuously updated throughout the trading day and is made available to market makers, brokers, dealers, and broker-dealers.

A broker-dealer is not required to have a customer's trade order filled in any particular marketplace in fulfilling its obligation to seek to obtain the best available price for a customer's trade. It can route a customer's order to any outside marketplace that will provide the customer with the best available price. It should be noted that there could be more than one marketplace that can simultaneously provide the customer with a best available price that will satisfy the broker-dealer's best execution obligation.

A broker-dealer could also seek to internalize an order and fill an order itself by trading on its own behalf with a customer. But there are many customer orders that are not eligible for internalization because the broker-dealer could be perceived as unfairly taking advantage of the customer by internalizing the trade order. When acting as an agent for a customer, a broker-dealer cannot use information obtained from customers unfairly to profit from trading from trading with the customer from its own account. For example, when market makers obtained access to and were receiving customer orders before the markets opened, it raised concerns. The concerns were that market makers could use that information to determine market direction and strength and to profit from their own order flow when they traded for their own accounts once the markets opened.

A market order is an order to buy or sell a stock at the best price available at the time the order is filled. Market orders will generally be filled at or close to the NBBO. There are times, however, when trades will be filled at prices that are superior (higher than the highest bid or lower than the lowest ask) or inferior (lower than the highest bid or higher than the lowest ask) to the NBBO. Execution of a trade at a price that is superior to the NBBO is referred to as price improvement. Execution of a trade at a price that is inferior to the NBBO is referred to as price disimprovement.

A trade also can be executed with other types of improvement from the NBBO, such as size improvement and speed improvement. Size refers to the magnitude or number of shares of a trade offer or an executed trade. Size improvement refers to execution of a transaction in a magnitude or amount of shares that is greater than the amount of shares than the size quoted in the NBBO. Speed improvement refers to executing a trade faster than a trade quoted in the NBBO could be executed.

There are a variety of factors that can result in improvement or disimprovement from the NBBO that are related to the characteristics of the various marketplaces for transacting in financial instruments. For example, small differences in the speed at which a trade order is executed at a marketplace can cause price improvement or disimprovement because market prices can change significantly in a fraction of a second.

Different characteristics of different marketplaces can provide different advantages or disadvantages in speed of execution. For example, trading via a specialist provides several disadvantages. First, according to the April 2002 11Ac1-5 report, the average time it takes for a specialist on the NYSE to execute a single trade is approximately 20 seconds. During this 20-second long delay, the market price may move significantly and a trade order could be executed at a worse price than if it was executed in another marketplace during that 20 second delay. Second, according to the April 2002 11Ac1-5 report, on average, a specialist at the NYSE provides approximately a 0.55 cent improvement over the NBBO bid/offer price for orders between 100-499 shares, provides approximately a 0.1 cent disimprovement (i.e., a worse price) over the NBBO bid/offer price for orders between 500 and 1999 shares, and overall provides approximately a 0.49 cent disimprovement (i.e., a worse price) over the NBBO bid/offer price for orders between 1000-9999 shares.

By contrast, an electronic exchange or ECN provides much faster trade order execution than exchanges that use specialists. Although the average price from a specialist is generally worse than the NBBO price, there are times when an exchange that uses specialists will provide better prices than the electronic exchanges and ECNs.

There are other characteristics of particular marketplaces that relate to other factors that can result in price improvement and disimprovement. For example, there are some marketplaces that allow subpenny pricing (i.e., pricing of trades at down to the one-tenth of a penny level as opposed to down only to the penny level), while other marketplaces do not. The allowance of subpenny pricing in some marketplaces, but not others, is another factor that could contribute to price improvement or dismiprovement in certain market situations.

There are fully automated trading systems that reduce the latency period to execute a trade; however, these systems typically only offer the customer the actual NBBO bid/offer prices. Additionally, there are systems that provide modest price improvements above the NBBO bid/offer price; however, these systems are not fully automated. These systems also do not enable broker-dealers to internalize customer trade orders.

Accordingly, it is desirable to provide a method and a system for fully automating trade order processing that provides improvement (including price, size, and speed improvement) from the NBBO that is capable of being used for both agency and principal executions and for internalizing agency executions.

SUMMARY OF THE INVENTION

Accordingly, it is the object of the present invention to overcome the deficiencies in the prior art to make available a system and method for automating trade order processing that provides improvement from the NBBO that is capable of being used for both agency and principal executions and for internalizing agency executions.

In one embodiment, computer-implemented system for processing a trade order comprising an order router; a National Best Bid and Offer (NBBO) feed; and an algorithm engine, wherein the order router is configured to analyze quotes received from the algorithm engine and the NBBO feed; determine whether the trade order can be filled with price improvement from the NBBO quote; and transmit the trade to one of i) a marketplace where the trade order can be filled with improvement from the NBBO quote or ii) a marketplace where the trade order can be filled at the NBBO quote, wherein the algorithm engine is configured to not have access to the trade order.

In other embodiments, the order router is configured to analyze whether the improvement is one or more of price improvement, size improvement, and speed improvement; the marketplace where the trade order can be filled with improvement from the NBBO quote is a reporting facility or a marketplace that can be used as a reporting facility; and the algorithm engine is configured to make a quote with a predetermined improvement before the trade order is received.

In another embodiment, the method involves receiving a trade order; analyzing quotes from an algorithm engine and from an NBBO feed; selecting a marketplace based on the analyzed quotes; transmitting the trade order to the selected marketplace to be filled, wherein the algorithm engine is not provided with access to the trade order.

In yet other embodiments, the method involves the further steps of selecting the marketplace based on whether the trade order can be filled with improvement, including price, size, and speed improvement from the NBBO quote. The improvements can also be predetermined before the trade order is received.

In further embodiments, the method involves internalizing the order and transmitting the order to a reporting facility.

An advantage of the invention is that it can improve the speed at which trade orders are processed and executed from the NBBO.

Another advantage of the invention is that it can be used to obtain price improvement from the NBBO.

Another advantage of the invention is that it can be used to obtain size improvement over the NBBO.

Yet another advantage the invention is that it can be used for processing agency and principal executions and for internalizing customer trades without raising concerns of misuse of customer information.

These objects and advantages of the invention described above are illustrative and not exhaustive. The foregoing advantages and other advantages will become more apparent from the accompanying drawings and following detailed description.

BRIEF DESCRIPTION OF DRAWING

The following detailed description, which is given by way of example that is not intended to limit the present invention, will be best understood in conjunction with the accompanying drawing in which.

DETAILED DESCRIPTION OF THE INVENTION

Figure 1:
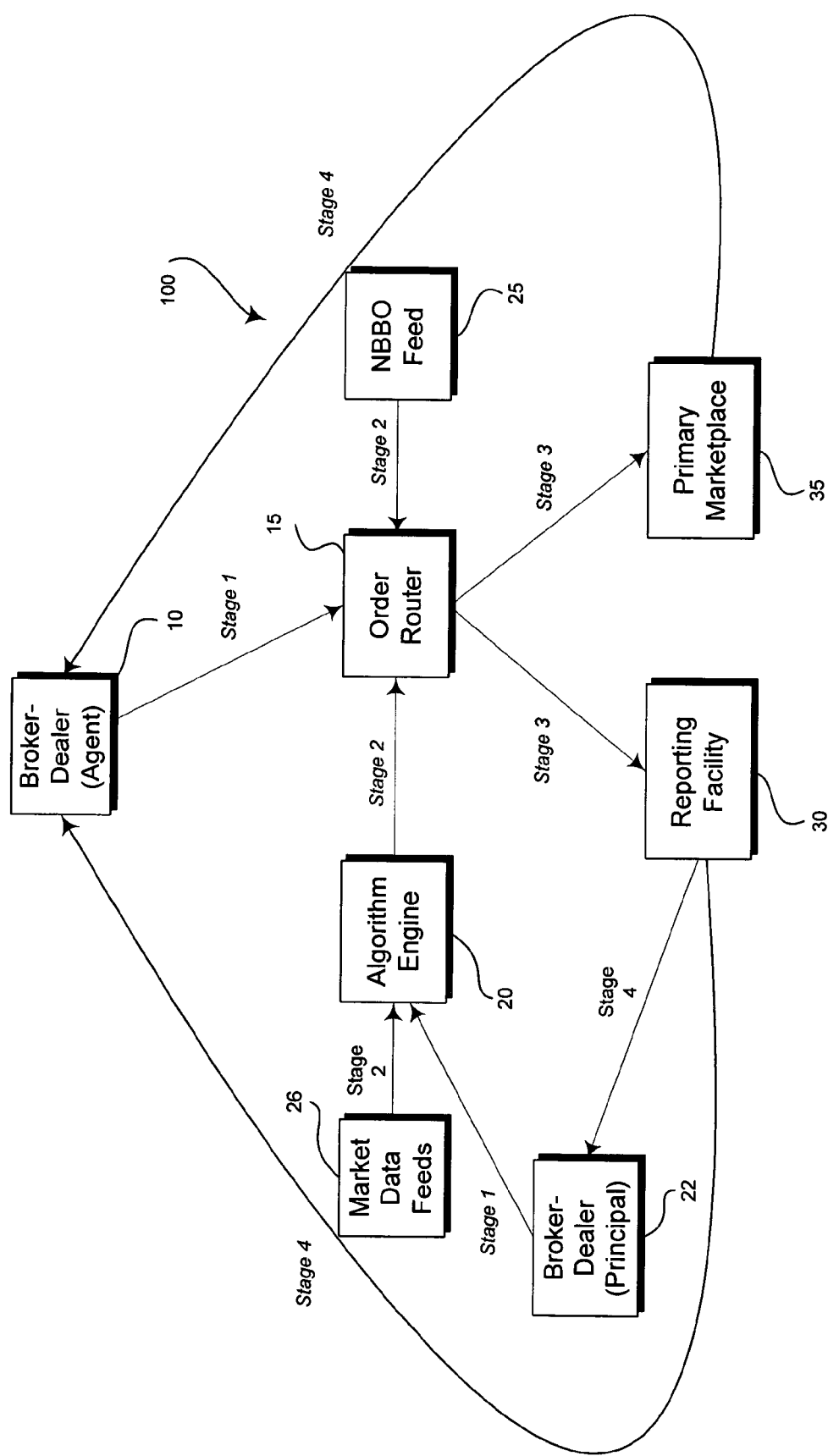
FIG. 1 schematically illustrates the inventive flow of a preferred embodiment of the automated trading system, in accordance with an embodiment of the present invention.

As shown in FIG. 1, the inventive system 100 comprises four stages. In stage 1, Broker-Dealer 10, which is a broker-dealer acting as an agent, transmits a trade order to a so-called "order router" 15. Typically, a customer of Broker-Dealer 10 would have placed the order, but the order also could have been placed by an entity that is not a customer of Broker-Dealer 10, including a marketplace (e.g., the NYSE). The trade order contains market data that includes the name of the security (e.g., a stock), the amount of shares in the trade, they type of trade (e.g., whether the trade is a buy or a sell), and other trade-related information. Order router 15 may be one or more network servers, a stand-alone computer, or other machine comprising a processor. Broker-Dealer 22 is the same Broker-Dealer as Broker-Dealer 10, but acting as a principal and not acting as an agent.

In stage 2, order router 15 compares the bid/offer price quote data received from both the algorithm engine 20 and from the NBBO Feed 25. The NBBO Feed 25 and algorithm engine 20 are described below. Order router 15 transmits the order to a marketplace where the best available price can be obtained that is selected from several possible marketplaces for filling the order.

NBBO feed 25 is a direct real-time feed of market data that includes NBBO bid/offer prices. NBBO feed 25 may be provided to router 15 by existing market data providers, usually for a fee. Note that this inventive system is fully applicable to NBBO or other standard bid/offer prices for other exchanges.

Algorithm engine 20 receives information that includes market data from Market Data Feeds 26 that includes real time data regarding trade orders from various marketplaces. Existing market data providers also provide this market data, usually for a fee. Market Data Feeds 26 contain additional market data from primary marketplaces beyond the data that order router receives from NBBO feed 25. Algorithm engine 20 is also provided with information that includes real time market information regarding the trades of broker dealer 22 that have been executed.

It is important to note that broker-dealer 22 acting as a principal is not provided with access to information regarding the trade orders of broker-dealer 10 acting as an agent. This structure in which agency execution market data is separated from the algorithm engine enables the method and system to be used to internalize trade orders without raising concerns over misuse of customer market data and obtain improvement from the NBBO.

Algorithm engine is programmed with knowledge of the securities in which broker-dealer 22 acts as a market maker. Algorithm engine 20 is also programmed to know additional information regarding the proprietary trading strategies of broker-dealer 22 acting as a principal, including for example, the risk tolerance of broker-dealer 22 for the securities for which it is a market maker, and how to apply those proprietary strategies using statistical tools. Algorithm engine is also programmed with information regarding the characteristics of different marketplaces that could affect price, size, and speed with which trade order can be filled. Using the market data input to and other information programmed into it, algorithm engine 20 generates bid/offer price quotes for broker-dealer 22 acting as a principal for the securities in which it acts as a market maker.

In one embodiment, the market information input to algorithm engine 20 selectively generates bid and/or offer prices at an amount better than the NBBO price (e.g., 1 cent) that is predetermined before the trade order is received. That is, based on the market information supplied and other information programmed into it, the algorithm engine 20 determines whether it will quote a better price, by the predetermined amount, than the NBBO price. For example, based on the market information provided, algorithm engine 20 may generate a bid quote of $2.11 and an offer quote of $2.15 for each share of stock X, while the NBBO bid and offer quote for stock X is $2.10 and $2.16, respectively. In another embodiment, if algorithm engine 20 determines that it will quote the bid and/or offer at a better price from the NBBO quote, then it generates a simple indication that its quote will be accepted at a predetermined price better than the NBBO quote. If engine 20 determines that the quote will not be better, then it generates an indication that its quote will not be accepted.

In another embodiment, the algorithm engine selectively generates quotes that provide size improvement from the NBBO quote in predetermined amounts. The algorithm engine also could be programmed to selectively generate quotes that provide speed improvement over the NBBO. Of course, engine 20 may also selectively generate price and size improvements at non-predetermined amounts using more complex mathematical formula and models.

In stage 3, order router 15 processes the received trade order, by transmitting said order to either: (1) one of a possible plurality of primary marketplaces 35; or (2) one of a possible plurality of reporting facilities (e.g., another marketplace) 30 designated by the broker-dealer. The decision of order router 15 is based on streaming quote data received from algorithm engine 20 and market data from NBBO feed 25.

In one embodiment, if the quote received from algorithm engine 20 provides improvement (price improvement, size improvement, speed improvement, etc.) from the NBBO, then broker-dealer 22 acting as a principal will fill the order itself (i.e., internalize the order) and order router 15 will select one of a plurality of reporting facilities to fill the trade order. In another embodiment, broker-dealer 22 acting as a principal will fill the trade order itself (i.e.,. internalize the order) and order router 15 will select one of, a plurality of reporting facilities if the quote received from the algorithm engine provides one or more different types of improvement from the NBBO.

The reporting facility 30 may be any reporting facility, including for example, the Cincinnati Stock Exchange, the NASDAQ ACT System, etc. Because the quote from broker-dealer 22 acting as a principal matches the trade order, there is no need for the trade order to be routed to a primary marketplace. Routing the trade order to a transfer facility instead achieves significant improvement in speed of execution.

In stage 3, if algorithm engine 20 does not quote any improvement from the NBBO or does not quote improvement in one or more different types of improvement, then router 15 selects one of a plurality of primary marketplaces 35. The primary marketplace 35 may be any exchange, such as the NYSE, the American Stock Exchange, NASDAQ, ECN, etc.

Once the trade order is filled, it is reported to broker-dealer 10, in stage 4. However, if router 15 selected reporting facility 30, then, in stage 3, an automated computer processor (not shown) at reporting facility 30 executes the trade. Once the trade order is filled, it is reported to the original broker-dealer 10, and to broker-dealer 22 for managing the resulting inventory of securities, in stage 4. Note that the data transmitted in stages 1-4 trade order may be sent via satellite, wireless, and/or terrestrial communication links, and the like.

In addition, it is important to note that when a trade order is internalized in the above-described fully automated system, the time to execute a trade is reduced from approximately 20 seconds to less than 250 milliseconds, i.e., essentially instantaneously. The structure of the system, with algorithm engine 20 being separated from order router 15, contributes significantly to this reduction in execution time. In the current implementation, the vast majority of the less than 250 milliseconds comes from the time it takes for the trade order to be filled at the primary marketplace or reporting facility. Preferably, it takes approximately 4 milliseconds from the time that a trade order is received to select a marketplace for filling the order. These speeds could not have been previously obtained without the inventive system and method.

Accordingly, the present invention advantageously allows the broker-dealer (and customers of the broker-dealer) to benefit from a price improvement (e.g., 1 cent) from the NBBO price, as well as a virtually instantaneous trade (vis-à-vis 20 seconds), if algorithm engine 20 quotes a better price than the NBBO feed. The present invention also can provide the benefit of size and other types of improvement. Further, if the algorithm engine 20 does not quote a better price than the NBBO price, then the trade from the broker-dealer (or its customer) will simply be sent to primary marketplace, as would ordinarily occur.

Finally, the above-described embodiments of the invention are intended to be illustrative only. Those having ordinary skill in the art could devise numerous alternative embodiments without departing from the spirit and scope of the invention.

What is claimed is:

1. A computer-implemented method comprising:
receiving a trade order at an order router comprising a processor;
receiving a quote at the order router that is generated from an algorithm engine that does not have access to the trade order;
receiving quotes at the order router from a National Best Bid and Offer (NBBO) feed;
the order router analyzing the quotes received from the algorithm engine and from NBBO feed;
the order router selecting a marketplace for the trade order based on comparing the analyzed quotes to the trade order; and
the order router transmitting the trade order to the selected marketplace to be filled.

2. The method of claim 1, wherein the step of selecting further comprises the step of selecting the marketplace based on whether the trade order can be filled with improvement from the NBBO quote.

3. The method of claim 2, wherein the step of selecting further comprises the step of selecting the marketplace based on whether the improvement from the NBBO quote is one or more of size improvement and speed improvement.

4. The method of claim 3, wherein the selected marketplace is a reporting facility or a marketplace that can be used as a reporting facility.

5. The method of claim 3, wherein the algorithm engine is programmed to quote a predetermined improvement from the NBBO quote.

6. The method of claim 5, wherein the algorithm engine is programmed to quote a predetermined improvement from the NBBO.

7. The method of claim 2, wherein the selected marketplace is a reporting facility or a marketplace that can be used as a reporting facility.

8. The method of claim 2, wherein the algorithm engine is programmed to quote a predetermined improvement from the NBBO quote.

9. The method of claim 2, wherein the algorithm engine is programmed to selectively generate quotes that provide a predetermined improvement from the NBBO quote.

10. The method of claim 2, wherein the algorithm engine is programmed to selectively generate quotes that provide non-predetermined improvement from the NBBO quote.

11. A computer-implemented method comprising:
receiving a trade order at an order router comprising a processor;
receiving at the order router a quote from an algorithm engine that is generated without having access to the trade order;
receiving at the order router a quote from a National Best Bid and Offer (NBBO) feed;
the order router analyzing the quotes received from the algorithm engine and the NBBO feed;
the order router determining whether the trade order can be filled with improvement from the NBBO quote based on comparing the algorithm engine and NBBO quotes to the trade order; and
the order router transmitting the trade order to one of (a) a marketplace where the trade order can be filled with improvement from the NBBO quote and (b) a marketplace where the trade order can be filled at the NBBO quote.

12. The method of claim 11, wherein the improvement is one or more of size improvement and speed improvement.

13. The method of claim 12, wherein the algorithm engine is programmed to quote a predetermined improvement from the NBBO quote.

14. The method of claim 11, wherein the marketplace where the trade order can be filled with improvement from the NBBO quote is a reporting facility or a marketplace that can be used as a reporting facility.

15. The method of claim 11, wherein the algorithm engine is programmed to quote a predetermined improvement from the NBBO quote.

16. The method of claim 11, wherein the algorithm engine is programmed to selectively generate quotes that provide a predetermined improvement from the NBBO quote.

17. The method of claim 11, wherein the algorithm engine is programmed to selectively generate quotes that provide non-predetermined improvement from the NBBO quote.

18. A computer-implemented system for processing a trade order comprising:
an order router comprising a processor;
a National Best Bid and Offer (NBBO) feed; and
an algorithm engine,
wherein the order router is configured to:
a) receive trade orders;
b) receive quotes from the algorithm engine that are generated without access to the trade orders;
c) receive quotes from the NBBO feed;
d) analyze quotes received from the algorithm engine and the NBBO feed;
e) determine whether the trade order can be filled with improvement from the NBBO quotes by comparing the trade order to the NBBO and algorithm engine quotes; and
f) transmit the trade order to one of i) a marketplace where the trade order can be filled with improvement from the NBBO quote or ii) a marketplace where the trade order can be filled at the NBBO quote.

19. The system of claim 18, wherein the order router is configured to analyze whether the improvement is one or more of size improvement and speed improvement.

20. The system of claim 18, wherein the marketplace where the trade order can be filled with improvement from the NBBO quote is a reporting facility or a marketplace that can be used as a reporting facility.

21. The system of claim 20, wherein the algorithm engine is programmed to quote a predetermined improvement from the NBBO.

22. The system of claim 18, wherein the algorithm engine is programmed to quote a predetermined improvement from the NBBO quotes.

23. The system of claim 18, wherein the algorithm engine is configured to receive market data comprising data from market data feeds, and wherein the algorithm engine is programmed with information comprising proprietary trading strategies of a broker-dealer and characteristics of marketplaces that could affect price, size, and speed with which the trade order can be filled.

24. The system of claim 18, wherein the algorithm engine is programmed to selectively generate quotes that provide a predetermined improvement from the NBBO quotes.

25. The system of claim 18, wherein the algorithm engine is programmed to selectively generate quotes that provide non-predetermined improvement from the NBBO quotes.

26. An order router comprising a processor that is configured to:
a) receive and analyze trade orders, quotes from an algorithm engine that does not have knowledge of the trade orders, and quotes from a National Best Bid and Offer (NBBO) feed;
b) determine whether the trade orders can be filled with improvement from the NBBO quotes based on comparing the trade order to the quotes from the algorithm engine and the NBBO feed; and
c) transmit the trade orders to one of i) a marketplace where the trade order can be filled with improvement from the NBBO or ii) a marketplace where the trade order can be filled at the NBBO.

27. The order router of claim 26, wherein the order router is further configured to:
transmit the orders to a reporting facility or a marketplace that can be used as a reporting facility if the trade orders can be filled with improvement from the NBBO quotes.

28. The method of claim 26, wherein the algorithm engine is programmed to selectively generate quotes that provide a predetermined improvement from the NBBO quotes.

29. The method of claim 26, wherein the algorithm engine is programmed to selectively generate quotes that provide non-predetermined improvement from the NBBO quotes.

* * * * *

UNITED STATES PATENT AND TRADEMARK OFFICE
CERTIFICATE OF CORRECTION

PATENT NO. : 7,660,761 B2  Page 1 of 1
APPLICATION NO. : 10/623434
DATED : February 9, 2010
INVENTOR(S) : Zhou et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1244 days.

Signed and Sealed this

Thirtieth Day of November, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,660,761 B2 | |
| APPLICATION NO. | : 10/623434 | |
| DATED | : February 9, 2010 | |
| INVENTOR(S) | : Zhou et al. | |

It is certified that error appears in the above-identified patent and that said Letters Patent is hereby corrected as shown below:

Cancel claim 6, lines 56-58 and insert the following claim:

--6.  The method of claim 2, wherein the selected marketplace is a reporting facility or a marketplace that can be used as a reporting facility.--

Cancel claim 7, lines 59-61 and insert the following claim:

--7.  The method of claim 6, wherein the algorithm engine is programmed to quote a predetermined improvement from the NBBO.--

Signed and Sealed this
Twenty-sixth Day of April, 2011

David J. Kappos
*Director of the United States Patent and Trademark Office*